United States Patent [19]
Hofer et al.

[11] Patent Number: 5,595,139
[45] Date of Patent: Jan. 21, 1997

[54] HOG FEEDER

[75] Inventors: Joseph M. Hofer; Daniel J. Wipf, both of Lake Andes, S. Dak.

[73] Assignee: Lakeview Hutterian Brethren, Inc., Lake Andes, S. Dak.

[21] Appl. No.: 275,033

[22] Filed: Jul. 14, 1994

[51] Int. Cl.$^6$ .................................................. A01K 5/01
[52] U.S. Cl. ............................ 119/54; 119/53.5; 119/902
[58] Field of Search ............................ 119/53, 53.5, 54, 119/902

[56] References Cited

U.S. PATENT DOCUMENTS

| | | | |
|---|---|---|---|
| 1,303,917 | 5/1919 | Klump | 119/902 X |
| 1,553,502 | 9/1925 | Boyes . | |
| 1,879,247 | 9/1932 | Holliday | 119/54 |
| 2,153,455 | 4/1939 | Casper et al. | 119/54 |
| 2,165,121 | 7/1939 | Amstutz . | |
| 2,808,029 | 10/1957 | Geerlings | 119/53.5 |
| 4,385,591 | 5/1983 | Petersen | 119/53.5 |
| 5,036,798 | 8/1991 | King | 119/53.5 |
| 5,123,379 | 6/1992 | von Taschitzki | 119/54 X |

FOREIGN PATENT DOCUMENTS 1170438  1/1959  France ........................... 119/53

*Primary Examiner*—Robert P. Swiatek
*Attorney, Agent, or Firm*— Moore & Hansen

[57] ABSTRACT

An improved animal self-feeder that has a feed reservoir vertically disposed above a trough and that has an intermediate feeding plate disposed between the reservoir and the trough. The self-feeder includes an outlet for discharging feed downwardly from the reservoir onto the intermediate feed plate from which the animal can feed or can knock the feed into the trough below to feed. The self-feeder further includes an agitation assembly for agitating the feed within the reservoir to enhance its flow through the outlet. The agitation assembly is rotationally mounted within the reservoir such that it is rotatable through a complete circle, or 360°. In a preferred embodiment the present invention further includes a jack screw and crank for changing the elevation of the agitation assembly and feed plate.

32 Claims, 2 Drawing Sheets

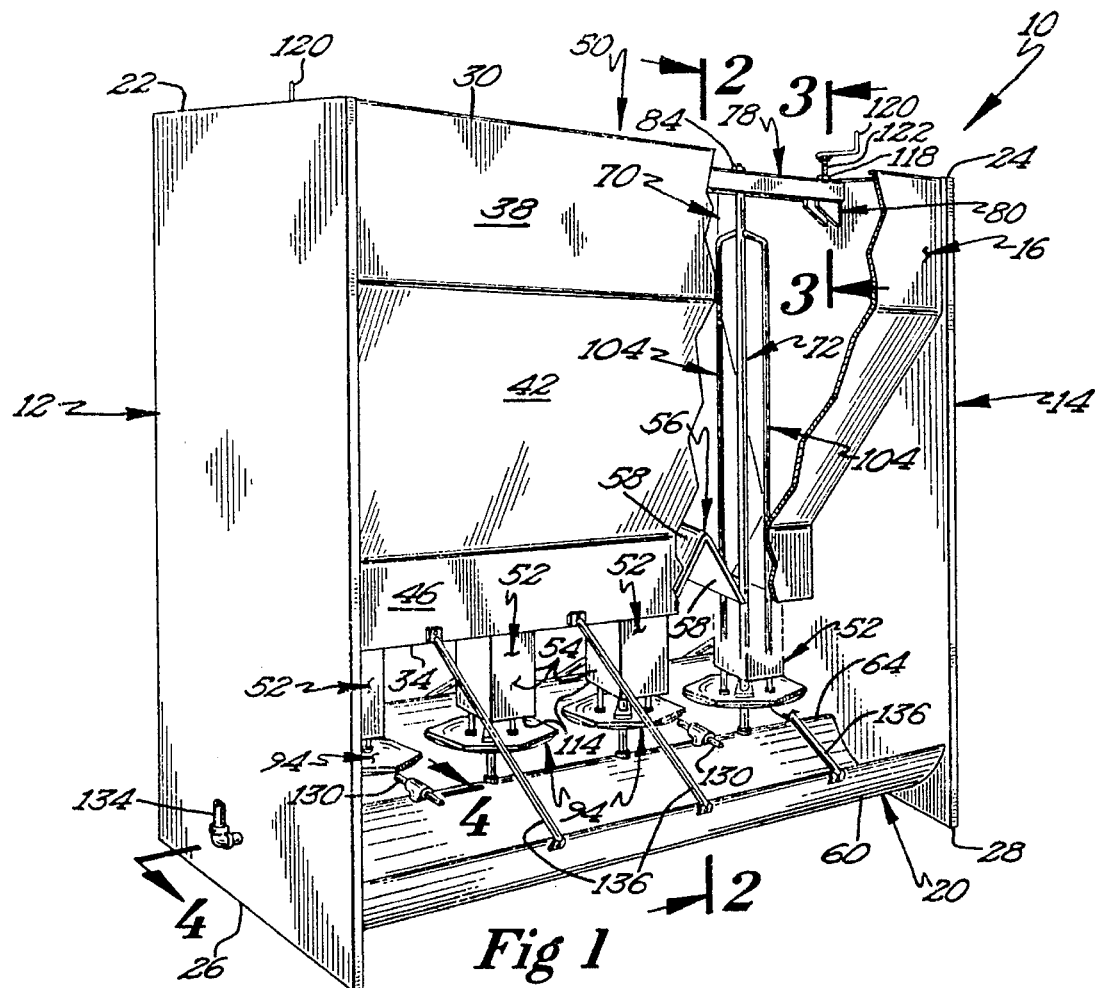
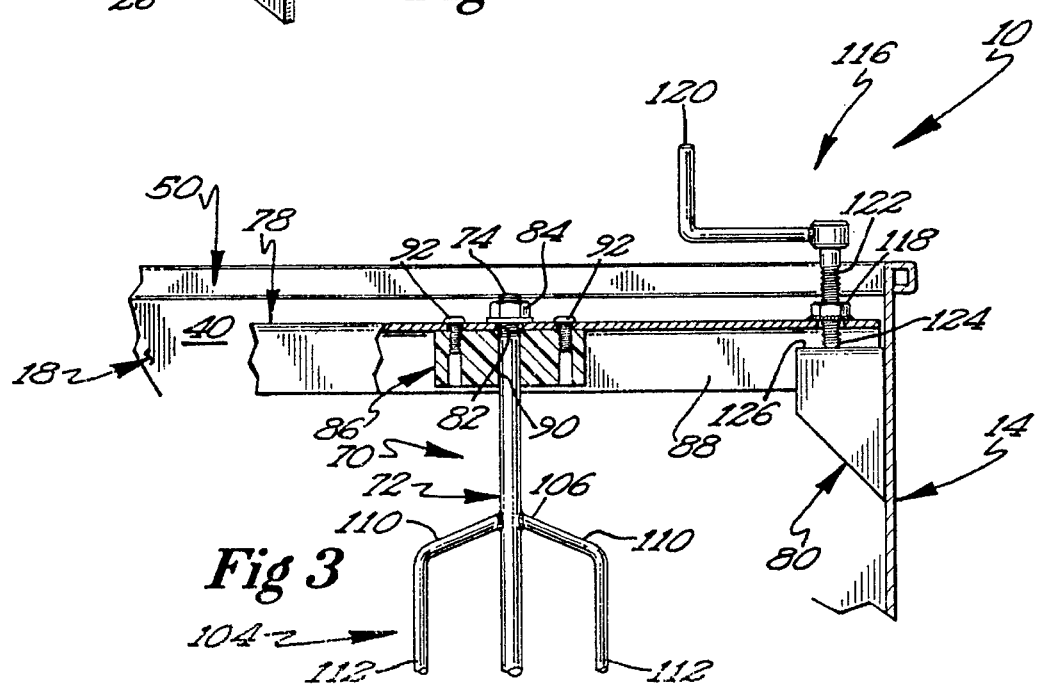

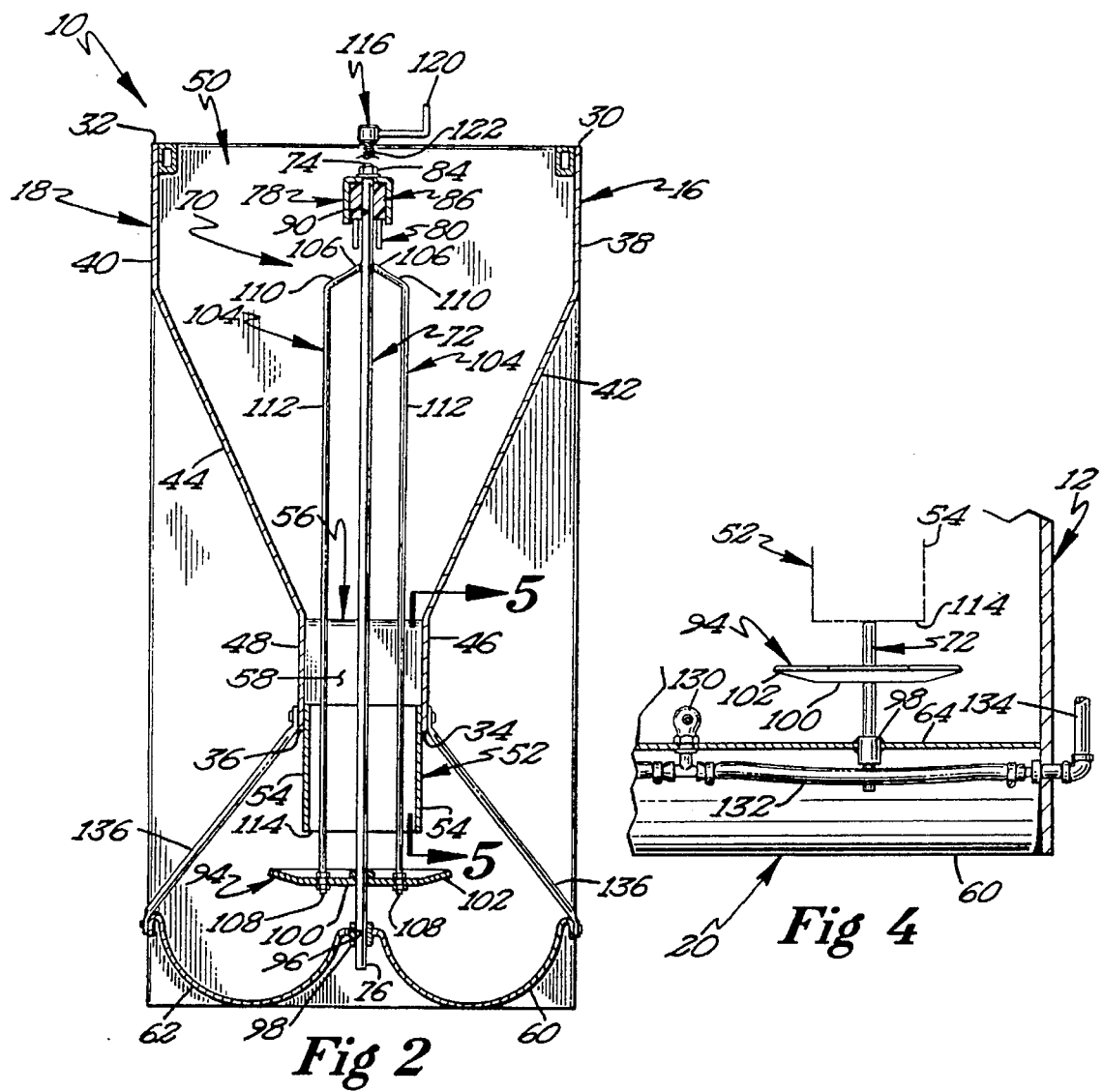
Fig 2
Fig 4
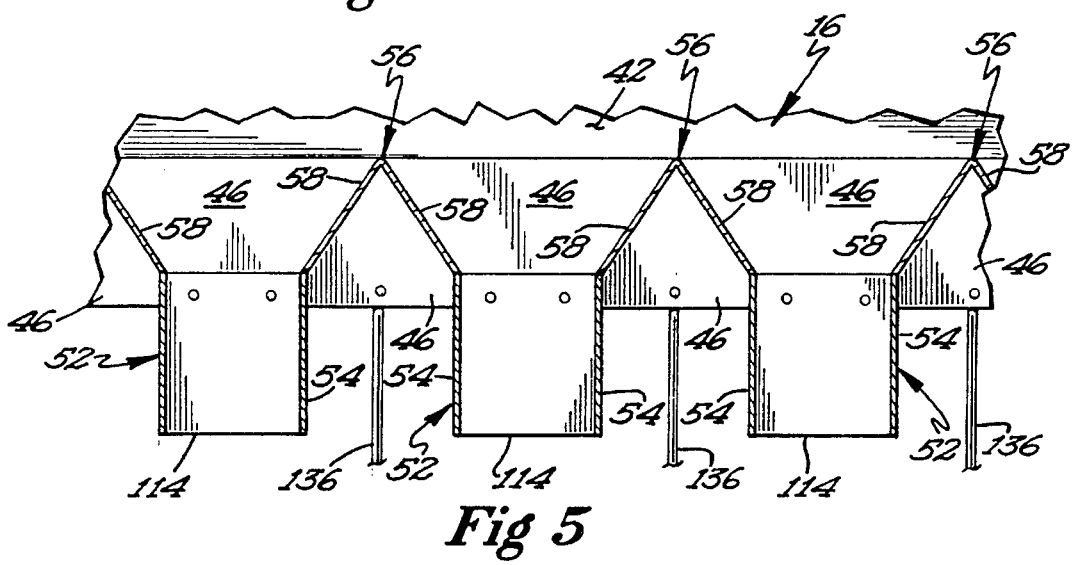
Fig 5

## HOG FEEDER

FIELD OF THE INVENTION

The present invention relates generally to apparatus used to feed animals and in particular to the self-feeding type of feeders for hogs.

BACKGROUND OF THE PRESENT INVENTION

There are many known designs of livestock self-feeders commercially available and patented. They typically include a feed reservoir disposed over a trough into which the feed is dropped from the reservoir. The feed used in these feeders is seldom free flowing and tends to clump in the reservoir outlets. To combat this, the feeders include some mechanism by which the self-feeding animals can agitate the feed to unclump it or to unclog the opening to cause the feed to drop from the reservoir into the trough.

Much effort has been directed at developing a self-feeder for hogs in particular. Hogs tend to waste a large amount of feed if given the opportunity by knocking it onto the floor or ground as it exits the feed reservoir or from the feeder trough after it has fallen therein. The agitation devices utilized in these feeders tend to take the form of a rod that is swept from side to side by the hog's snout. Some feed naturally falls on the hog's snout when these devices are used and may then dropped onto the floor by the hog.

It would be desirable to have a hog feeder that provided for a reduced amount of feed waste by the self-feeding hog and that could readily vary the amount of feed provided to the trough below to account for different sized hogs and differing feed rations.

SUMMARY OF THE INVENTION

It is an object of the present invention to provide new and improved apparatus that is not subject to the foregoing disadvantages.

It is another object of the present invention to provide an improved self-feeder that allowed for reduced wastage of feed by the self-feeding animal.

It is still another object of the present invention to provide an improved self-feeder that provides for adjustable dispensing of feed.

It is yet another object of the present invention to provide an improved animal self-feeder that enables an animal to feed at at least two vertically disposed heights.

The foregoing objects of the present invention are provided by an improved animal self-feeder that has a feed reservoir vertically disposed above a trough and that has an intermediate feeding plate disposed between the reservoir and the trough. The self-feeder reservoir includes an outlet for discharging feed downwardly onto the intermediate feed plate from which the animal can feed or can knock the feed into the trough below to feed. The self-feeder further includes an agitation assembly disposed within the feed reservoir and actuatable by the self-feeding animal for agitating the feed within the reservoir to enhance its flow through the outlet. The agitation assembly includes a rod vertically disposed within the reservoir with an end thereof extending through the outlet into an attachment with the feed plate. The assembly further has at least one agitator bar that extends outwardly and downwardly from the top of the rod through the outlet into an attachment with the feed plate. The rod is rotationally mounted within the reservoir such that the rod and the attached feed plate are rotatable through a complete circle, or 360°.

In a preferred embodiment the top end of the rod is mounted to a u-shaped mounting bracket that is suspended over a pair of shelves projecting inwardly from opposing walls of the reservoir. The top end of the rod, which is threaded, is inserted through a synthetic bushing attached to the mounting bracket and attached thereto by means of a threaded fastener. The other, bottom, end is rotatably received by an appropriate aperture in the trough.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 1 is a perspective view of a hog feeder in accord with the present invention.

FIG. 2 is a cross sectional view of the hog feeder shown in FIG. 1 taken along cutting plane 2—2 thereof.

FIG. 3 is a cross sectional view of the hog feeder shown in FIG. 1 taken along cutting plane 3—3 thereof.

FIG. 4 is a cross sectional view of the hog feeder shown in FIG. 1 taken along cutting plane 4—4 thereof.

FIG. 5 is a cross sectional view of the hog feeder shown in FIG. 1 taken along cutting plane 5—5 of FIG. 2.

DETAILED DESCRIPTION OF THE INVENTION

Referring now to FIGS. 1 and 2 principally, it will be seen that an improved animal self-feeder 10 in accord with the present invention includes a pair of opposed end walls 12, 14, a pair of opposed side walls 16, 18 extending between the end walls 12, 14, and a trough 20 also extending between the end walls 12, 14. End walls 12, 14 each have top ends 22, 24 and bottom ends 26, 28, respectively. Similarly, side walls 16, 18, each have top ends 30, 32, and bottom ends 34, 36, respectively. Each side wall 16, 18 includes an upper upright or vertically oriented portion 38, 40, respectively, extending from the side wall top ends 30, 32, respectively, downwardly. Each side wall 16, 18 further includes an inwardly sloping portion 42, 44 extending downwardly and inwardly from upright portion 38, 40, respectively. In other words, sloping or sloped portions 42 and 44 of side walls 16, 18 respectively, slope towards the center of the feeder 10; that is, towards each other. Each side wall 16, 18 continues downward from the termination of the sloped portions 42, 44, respectively with a lower upright or vertically oriented portion 46, 48, respectively. Side walls 16, 18 terminate slightly below the midpoint of the height of the end walls 12, 14. The side end walls 12, 14 and the side walls 16, 18 cooperate to define a feed reservoir 50 having a rectangular configuration when viewed from the top, the reservoir being provided to store feed for the self-feeding animal.

Reservoir 50 includes at least one outlet 52 for the discharge of feed placed within the reservoir by the farmer. As best seen in the FIGS. 1, 2, and 5, each outlet 52 has a substantially square cross section in a plane lying perpendicular to a plane defined by the planar end walls 12, 14. That is, rod 72 defines an elongate axis and the outlets 52 each have a square cross section in a plane lying perpendicular to the rod elongate axis. Thus, each outlet has four planar sides 54. The outlets 52 may comprise separately assembled units that are then fastened in any known appropriate manner to the sloped portions 42, 44 of side walls 16, 18. The feed reservoir 50 further includes at least one inverted V-shaped divider 56. The dividers 56 provide sloped surfaces for feed flow. Feed within the reservoir 50 is thus directed by the sloped portions 42, 44 of side walls 16, 18 and the sloped surfaces 58 of the dividers 56. The dividers 56 are disposed between two adjacent feed outlets 52. If desired, a single sloped surface 58 may be provided that extends inwardly from the end walls, such as the surface 58 seen in FIG. 1 extending inwardly from end wall 14, to direct feed from the outer area of the reservoir into the outermost discharge outlets 52.

Trough 20 as shown in the embodiment of the present invention illustrated herein has a pair of ends attached to the end walls 12, 14, and includes a pair of elongate basins 60, 62 (FIG. 2) having substantially hemispheric cross sections disposed side by side and extending the length of the feeder 10 between the end walls 12, 14. Trough 20 is preferably manufactured from a single piece of material but may be formed from two separate basins that are then joined together in any appropriate known manner. The basins define a ridge 64 that extends the length thereof between the end walls 12, 14.

The feeder 10 further includes and agitation assembly 70 to be hereafter described. Because certain feeds, such as ground whole ear corn, tend to clump easily and because all feeds tend to clump when damp or wet, there is a tendency for the feed to clog or otherwise block the outlet. It is usually necessary to provide the self-feeding animal with some mechanism from agitating or stirring the feed held within the reservoir 50 to unclump the feed and to keep it flowing through the outlet. An agitation assembly 70 is therefore preferably provided for each outlet 2. Thus, assembly 70 includes an elongate rod 72 having a rod top end 74 and a rod bottom end 76 (FIG. 2). Rod 72 is mounted for full rotation, that is, a complete circle or 360°, within reservoir 50 substantially along the longitudinal centerline thereof.

As best seen in FIGS. 1–3, a mounting bracket 78 is suspended within the feed reservoir 50. Mounting bracket 78 has the configuration of a u-shaped bar and is disposed within the reservoir in an inverted position. A pair of shelves 80 are attached to the end walls 12, 14, near the top ends 22, 24, respectively. The inverted u-shaped mounting bracket is supported by shelves 80. That is, the u-shaped mounting bar is suspended over the shelves 80 such that the sides of the bar 78 depend downwardly and such that the u-shaped bar is supported thereby. As best seen in FIG. 3, each shelf 80 may be a u-shaped piece of material attached to the inner surface of the end walls 12, 14 in any known appropriate manner. Mounting bracket 78 includes at least one through hole 82 extending therethrough. The top end 74 of the rod 72 is extended therethrough. As shown, the top end is preferably threaded to receive a threaded fastener 84 and thus suspend the rod 72 from the mounting bracket 78. If desired, a bushing 86 may be disposed within the recess 88 formed between the arms of the u-shaped mounting bracket 78. If used, bushing 86 would also include a through hole 90 through which the rod 72 would extend. The bushing 86 may be attached to the mounting bracket 78 in any known, appropriate manner, including the use of threaded fasteners 92 as shown in FIG. 3. The weight of the suspended agitation assemblies 70 on the mounting bracket 78 functions to keep the mounting bracket in place relative to shelves 80.

As noted, each rod 72 extends through its respective outlet 52 and into engagement with a feed plate 94. Feed plate 94 may be attached to rod 72 in any known appropriate manner including welding, brazing or soldering, depending upon the type of material out of which both parts are made. Rod 72 extends through feed plate 94 such that its bottom end 76 is rotationally received within a recess or through hole 96 in ridge 64. To facilitate the free rotation of the rod 72, a bushing 98 may be disposed within the ridge through hole 96 and the bottom end 76 of rod 72 passed therethrough in the manner shown in FIG. 1.

Each feed plate 94 is suspended below its respective outlet 52 and above trough 20. The feed plate as shown has a hexagonal configuration and includes a central, substantially planar portion 100 through which rod 72 passes and an upwardly turned perimeter 102. In this manner, feed that flows through the outlet 52 drops first onto the feed plate 94, which serves as an intermediate feed platform for the animal. Because of the upturned perimeter 102 the feed is generally retained on the feed plate 94. The self-feeding animal can eat off the plate or can knock the feed off the feed plate 94 into the trough 20 below from which it can then feed. The present invention therefore provides two vertically separated sites for the animal to feed, which helps to eliminate waste since the animal has a first chance to eat off the upper feed plate 94 and the trough 20 catches feed that may be spilled from the feed plate 94.

Each agitator assembly 70 further preferably includes at least one agitator bar 104 having top and bottom ends 106 and 108 respectively. The top end 106 is affixed to the rod 72 near the top end thereof while the bottom end 108 is affixed to the feed plate 94. As illustrated the top end may be welded to the rod 72 while the bottom end 108 may be removably bolted to the feed plate 94, though other known means of attaching two such parts together may be used with the present invention. Agitator bar 104 includes an outwardly and downwardly extending portion 110 and a downwardly extending portion 112. Each agitator bar 104 thus extends through the outlet 52 substantially parallel to but spaced from rod 72. As shown in the Figures, two opposed agitator bars 104 are attached to each rod 72, though more could be used if desired. If additional agitator bars are used, they are preferably spaced substantially equidistant from each other circumferentially about rod 72.

Referring to FIGS. 1 and 3 in particular, it will be seen that the present invention further includes a means for raising and lowering the mounting bracket 78, and thus the attached rods 72, feed plates 94, and agitator bars 104, to control the amount of feed dispensed from the reservoir 50 through the outlets 52. That is, by changing the elevation of the feed plate 94 so as to raise it closer to the bottom 114 of the outlet 52, the vertical opening therebetween in reduced, which constrains the ability of the feed to flow freely. Thus, as seen in the Figures, a pair of jack screws 116 are provided with the jack screws 116 being located on opposite ends of the mounting bracket 78. Jack screw 116 includes a threaded fastener or passage 118 that is a part of or otherwise affixed to the top surface of the mounting bracket 78. Jack screw 116 further includes a crank 120 having a threaded shaft 122 that threadably engages the threaded fastener 118. The end 124 of the threaded shaft 122 engages the top surface 126 of the shelf 80. By rotating the crank 120, then, the operator can turn the threaded shaft into and out of the fastener 118 as desired, thereby increasing the distance between the mounting bracket 78 and the shelf (raising the feed plate 94) or decreasing the distance (lowering the feed plate 94), respectively.

Further features of the present invention include one or more water nipples 130 as desired and as known in the art that are connected by a hose 132 to an outside source of water 134. Additionally, braces 136 may be provided to provide additional support to the side walls 16, 18 as well as to divide the trough longitudinally into separate feeding areas to help eliminate or reduce fighting among feeding animals. Additionally, and as best seen in FIG. 2, the present invention as illustrated contemplates a feeder accessible to animals along either of its longitudinally extending sides, though the present invention could be constructed so as to be accessible from only one side.

In operation, a feeding animal such as a hog can engage the feed plate 94 with its snout and rotate the feed plate and the attached agitator bars 104 through a complete circle. The hexagonal configuration of the feed plate 94 facilitates the ability of the animal to rotate the agitation assembly because it provides a sufficient number of edges that the animal may engage with its snout. Additionally, because the agitation assembly 70 is not fixed vertically, the animal can lift up on the feed plate 94 to provide agitation of the feed in the reservoir in all three dimensions. Known agitation assemblies will not function with the present apparatus because they provide insufficient agitation for the feed flowing through the square outlets.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A feeder comprising:
   a feed trough;
   a feed reservoir for holding animal feed, said reservoir disposed above said trough and having an outlet for discharging feed;
   a feed agitation assembly for agitation of the animal feed, said agitation assembly comprising:
      a rod rotationally mounted to said feed reservoir, said rod having
         a first end extending through said outlet and a second, opposite end;
      at least one agitator bar extending outwardly therefrom;
      a feed plate, said feed plate being attached near said second rod end and disposed above said feed trough, said feed plate being capable of being rotated through 360°; and
      a plurality of agitator bars, each of said bars having a pair of ends, one of said ends being attached to said rod near said second rod end and the other bar end being attached to said feed plate.

2. The feeder of claim 1 wherein said feeder further includes a mounting bracket for rotationally mounting said rod to said feeder, said mounting bracket extending along the top side of said feeder.

3. The feeder of claim 1 wherein said rod has an elongate axis and said outlet has a substantially square cross section in a plane perpendicular to said rod axis.

4. The feeder of claim 1 wherein said trough includes an aperture for receiving said end of said rod extending through said outlet.

5. The feeder of claim 1 wherein said feed plate has a substantially planar surface and an outer perimeter, said outer perimeter being turned upwardly.

6. The feeder of claim 5 wherein said feed plate has a substantially hexagonal configuration.

7. The feeder of claim 1 wherein said feed plate has a substantially hexagonal configuration.

8. A feeder comprising:
   a feed trough;
   a feed reservoir for holding animal feed, said reservoir disposed above said trough and having an outlet for discharging feed;
   a feed agitation assembly for agitation of the animal feed, said agitation assembly comprising:
      a rod rotationally mounted to said feed reservoir, said rod having
         a first end extending through said outlet and a second, opposite end;
      at least one agitator bar extending outwardly therefrom; and
      a feed plate, said feed plate being attached near said second rod end and dispose above said feed trough, said feed plate being capable of being rotated through 360°;
   wherein said reservoir has a top side having a substantially rectangular configuration, said agitation assembly further comprises a plurality of agitator bars, each of said bars having a pair of ends, one of said ends being attached to said rod near to said top side and the other end being attached to said feed plate.

9. A feeder comprising:
   a feed trough;
   a feed reservoir for holding animal feed, said reservoir disposed above said trough and having an outlet for discharging feed;
   a feed agitation assembly for agitation of the animal feed, said agitation assembly comprising:
      a rod rotationally mounted to said feed reservoir, said rod having a first end extending through said outlet and a second, opposite end;
      at least one agitator bar extending outwardly therefrom; and
      a feed plate, said feed plate being attached near said second rod end and disposed above said feed trough, said feed plate being capable of being rotated through 360°;
   wherein said agitation assembly includes an even number of bars, said bars being spaced equidistantly circumferentially about said rod.

10. The feeder of claim 9 wherein said feeder further includes a mounting bracket for rotationally mounting said rod to said feeder, said mounting bracket extending along the top side of said feeder.

11. The feeder of claim 10 wherein said agitation assembly further comprises a plurality of agitator bars, each of said bars having a pair of ends, one of said ends being attached to said rod near to said mounting bracket and the other end being attached to said feed plate.

12. A feeder comprising:
   a pair of spaced apart end walls having top and bottom ends;
   a trough having a pair of ends, said trough ends attached to said side walls adjacent to said end wall bottom ends;
   a feed reservoir disposed above said trough, said feed reservoir being formed by said end walls and a pair of opposed side walls, said side walls extending between said end walls and being attached thereto, said feed reservoir including at least one discharge outlet for discharging feed held in said feed reservoir downwardly through said at least one outlet toward said trough;
   an agitator assembly for agitation of the feed in the feed reservoir to facilitate its flow through the at least one outlet, said agitator assembly comprising:

a rod rotationally mounted within said feed reservoir, said rod having first and second ends, said second end extending through said at least one outlet;

at least one agitator bar extending outwardly from said rod;

a feed plate, said feed plate being attached to said rod second end and disposed above said feed trough, said feed plate rotatable through 360°; and a plurality of agitator bars, each of said bars having top and bottom ends, said agitator bar top ends being attached to said rod near said rod first end and said agitator bar bottom being attached to said feed plate.

13. The feeder of claim 12 wherein said trough comprises a pair of elongate basins having substantially hemispheric cross sections, said basins disposed side by side.

14. The feeder of claim 12 wherein said rod second end is rotationally mounted to said trough.

15. The feeder of claim 12 wherein each of said agitator bars has a top portion extending outwardly and downwardly from said rod and a bottom portion extending downwardly from said top portion substantially parallel to said rod.

16. The feeder of claim 12 wherein said rod has an elongate axis and said at least one outlet has a substantially square cross section in a plane perpendicular to said rod axis.

17. A feeder comprising;

a pair of spaced apart end walls having top and bottom ends;

a trough having a pair of ends, said trough ends attached to said side walls adjacent to said end wall bottom ends;

a feed reservoir disposed above said trough, said feed reservoir being formed by said end walls and a pair of opposed side walls, said side walls extending between said end walls and being attached thereto, said feed reservoir including at least one discharge outlet for discharging feed held in said feed reservoir downwardly through said at least one outlet toward said trough;

an agitator assembly for agitation of the feed in the feed reservoir to facilitate its flow through the at least one outlet, said agitator assembly comprising:

a rod rotationally mounted within said feed reservoir, said rod having first and second ends, said second end extending through said at least one outlet;

at least one agitator bar extending outwardly from said rod; and a feed plate, said feed plate being attached to said rod second end and disposed above said feed trough, said feed plate rotatable through 360°;

wherein said reservoir has a top side having a substantially rectangular configuration, said agitation assembly further comprises a plurality of agitator bars, each of said bars having a pair of ends, one of said ends being attached to said rod near to said top side and the other end being attached to said feed plate.

18. The feeder of claim 17 wherein said agitation assembly includes an even number of agitator bars, said agitator bars being spaced equidistantly circumferentially about said rod.

19. The feeder of claim 17 wherein said feeder further includes a mounting bracket for rotationally mounting said rod to said feeder, said mounting bracket extending along the top side of said feeder.

20. The feeder of claim 19 wherein said mounting bracket comprises a u-shaped bar, said mounting bracket including at least one hole therein to rotatably receive said rod first end, said rod first end being threaded for receipt of a threaded fastener to retain said rod.

21. The feeder of claim 20 wherein said mounting bracket further includes a bushing having a through hole therein through which said rod first end extends, said bushing being disposed within said u-bracket.

22. The feeder of claim 19 wherein said mounting bracket comprises a u-shaped bar and said end walls include a pair of shelves projecting inwardly into said feed reservoir, said u-shaped bar being suspended over said shelves such that the sides of said bar depend downwardly and such that said u-shaped bar is supported thereby.

23. The feeder of claim 22 and further including means for changing the elevation of said mounting bracket relative to said trough.

24. The feeder of claim 23 wherein said means for changing the elevation comprises a pair of jack screws disposed at the ends of said mounting bracket, said jack screws being threaded into a threaded passage of said mounting bracket and engaging said shelves, whereby turning said jack screws raises and lowers said mounting bracket.

25. The feeder of claim 12 wherein said feed reservoir side walls include a top vertical portion and a bottom sloped portion, the sloped portions sloping toward the center of said feeder and toward each other.

26. The feeder of claim 25 wherein said rod has an upright elongate axis and said feeder comprises a plurality of outlets, said outlets each having a substantially square cross section in a plane perpendicular to said rod axis.

27. The feeder of claim 25 wherein said feeder further includes a mounting bracket for rotationally mounting said rod to said feeder, said mounting bracket extending along the top side of said feeder.

28. The feeder of claim 27 wherein said mounting bracket comprises a u-shaped bar, said mounting bracket including at least one hole therein to rotatably receive said rod first end, said rod first end being threaded for receipt of a threaded fastener to retain said rod.

29. The feeder of claim 28 wherein said mounting bracket further includes a bushing having a through hole therein through which said rod first end extends, said bushing being disposed within said u-bracket.

30. A feeder comprising:

a pair of spaced apart end walls having top and bottom ends;

a trough having a pair of ends, said trough ends attached to said side walls adjacent to said end wall bottom ends;

a feed reservoir disposed above said trough, said feed reservoir being formed by said end walls and a pair of opposed side walls, said side walls extending between said end walls and being attached thereto, said feed reservoir including at least one discharge outlet for discharging feed held in said feed reservoir downwardly through said at least one outlet toward said trough;

an agitator assembly for agitation of the feed in the feed reservoir to facilitate its flow through the at least one outlet, said agitator assembly comprising:

a rod rotationally mounted within said feed reservoir, said rod having first and second ends, said second end extending through said at least one outlet;

at least one agitator bar extending outwardly from said rod; and a feed plate, said feed plate being attached to said rod second end and disposed above said feed trough, said feed plate rotatable through 360°;

wherein said feed reservoir side walls include a top vertical portion and a bottom sloped portion, the sloped portions sloping towards the center of said feeder and toward each other; and wherein said feeder further includes a mounting bracket for rotationally mounting said rod to said feeder, said mounting bracket extending along the top side of said feeder; and comprising a u-shaped bar and said end walls include a pair of shelves projecting inwardly into said feed reservoir, said u-shaped bar being suspended over said shelves such that the sides of said bar depend downwardly and such that said u-shaped bar is supported thereby.

31. The feeder of claim 30 and further including means for changing the elevation of said mounting bracket relative to said trough.

32. The feeder of claim 31 wherein said means for changing the elevation comprises a pair of jack screws disposed at the ends of said mounting bracket, said jack screws being threaded into a threaded passage of said mounting bracket and engaging said shelves, whereby turning said jack screws raises and lowers said mounting bracket.

* * * * *